United States Patent
Nedunuri et al.

(10) Patent No.: US 12,190,077 B2
(45) Date of Patent: Jan. 7, 2025

(54) METHOD AND APPARATUS FOR ELIMINATING INTER-LINK SKEW IN HIGH-SPEED SERIAL DATA COMMUNICATIONS

(71) Applicant: XILINX, INC., San Jose, CA (US)

(72) Inventors: Sai Ram Venkata Pattabhi Nedunuri, Hyderabad (IN); Killivalavan Kaliyamoorthy, Cuddalore (IN)

(73) Assignee: XILINX, INC., San Jose, CA (US)

( * ) Notice: Subject to any disclaimer, the term of this patent is extended or adjusted under 35 U.S.C. 154(b) by 234 days.

(21) Appl. No.: 17/993,464

(22) Filed: Nov. 23, 2022

(65) Prior Publication Data

US 2024/0168710 A1     May 23, 2024

(51) Int. Cl.
*G06F 5/06* (2006.01)
*G06F 1/10* (2006.01)
*H04L 25/02* (2006.01)

(52) U.S. Cl.
CPC ............. *G06F 5/06* (2013.01); *G06F 1/10* (2013.01); *H04L 25/0272* (2013.01)

(58) Field of Classification Search
CPC ........... G06F 5/06; G06F 1/10; H04L 25/0272
See application file for complete search history.

(56) References Cited

U.S. PATENT DOCUMENTS

| | | | |
|---|---|---|---|
| 8,238,452 B1 * | 8/2012 | Sarmah | H04L 25/14 375/259 |
| 9,774,478 B1 * | 9/2017 | Mendel | G06F 5/06 |
| 10,826,502 B1 * | 11/2020 | Badizadegan | G06F 30/34 |

OTHER PUBLICATIONS

XiILINX, "7 Series FPGAs GTX/GTH Transceivers User Guide", Xilinx, Inc., UG476 (v1.12.1), Aug. 14, 2018, 506 pages, retrieved from https://docs.xilinx.com/v/u/en-US/ug476_7Series_Transceivers.

Sarmah, M. J., et al. "A Circuit to Eliminate Serial Skew in High-Speed Serial Communication Channels," in IEEE Transactions on Circuits and Systems II: Express Briefs, vol. 62, No. 12, pp. 1179-1183, Dec. 2015.

* cited by examiner

*Primary Examiner* — Eric T Oberly
(74) *Attorney, Agent, or Firm* — Patterson + Sheridan, LLP

(57) ABSTRACT

A communication system includes link circuits that receive serial data over one or more input serial links. The link circuits include a primary link circuit and a secondary link circuit. The secondary link circuit includes a de-serializer circuit configured to receive the serial data from the one or more input serial links and convert the serial data into parallel data, and an aligner circuit comprising a memory. The aligner circuit stops at least one of storing the parallel data in the memory and reading the memory based on a channel bonding signal generated based on a channel bonding symbol within the serial data. The aligner circuit outputs the channel bonding signal to a finite state machine (FSM) circuit of the primary link circuit. The aligner circuit outputs the parallel data based on receiving a read signal from the FSM circuit of the primary link circuit.

20 Claims, 9 Drawing Sheets

METHOD AND APPARATUS FOR ELIMINATING INTER-LINK SKEW IN HIGH-SPEED SERIAL DATA COMMUNICATIONS

TECHNICAL FIELD

Examples of the present disclosure generally relate to high-speed serial communications links. In particular, a system, apparatus and method are used to correct inter-link skew among multiple high-speed serial links within a data transmission system.

BACKGROUND

High-speed serial link protocols provide for some of the highest data rates in the transmission of high-speed serial data streams within modern-day data transmission systems. For example, DisplayPort™, HDMI™, etc. each achieve data rates in the order of gigabits-per-second (Gbps). This is accomplished by employing multiple high-speed serial links between the system transmitters and receivers. Parallel data from one data subsystem is serialized by a transmitter (TX) and presented to the multiple high-speed serial links. These data are transmitted serially and subsequently received and reassembled at the receiver (RX) where it is converted back to parallel data. However, in the process of data reassembly, data synchrony at the receiver is often lost with these high-speed transmission protocols due to static phase errors between the serial links, non-uniform cable lengths, and physical link delays. These parallel-to-serial and serial-to-parallel conversions occur per serial link and independently of one another.

SUMMARY

In one example, a system includes a plurality of link circuits each receives serial data over one or more input serial links. The plurality of link circuits include a primary link circuit and a secondary link circuit. The secondary link circuit includes a de-serializer circuit configured to receive the serial data from the one or more input serial links and convert the serial data into parallel data, and an aligner circuit comprising a memory. The aligner circuit stops at least one of storing the parallel data in the memory and reading the memory based on a channel bonding signal generated based on a channel bonding symbol within the serial data. Further, the aligner circuit outputs the channel bonding signal to a finite state machine (FSM) circuit of the primary link circuit and pause reading the memory. The aligner circuit further resumes reading the memory and output the parallel data based on receiving a read signal from the FSM circuit of the primary link circuit.

In one example, a method for implementing channel bonding includes receiving, with a de-serializer circuit of a first link circuit of a plurality of link circuits, serial data from an input serial link. The method further includes storing parallel data generated from the serial data in a memory of an aligner circuit of the first link circuit. Further, the method includes generating, with the aligner circuit, a channel bonding signal based on a channel bonding symbol being present in the serial data. The method further includes outputting the channel bonding signal to a finite state machine (FSM) circuit of a primary link circuit of the plurality of link circuits. The aligner circuit pauses reading the memory based on the generation of the channel bonding signal. Further, the method includes outputting the parallel data from the memory of the aligner circuit based on receiving a read signal from the FSM circuit of the primary link circuit.

In one example, a plurality of link circuits includes a primary link circuit and a secondary link circuit. The secondary link circuit receives serial data over one or more input serial links. Further, the secondary link circuit receives the serial data from the one or more input serial links and converts the serial data into parallel data. The secondary link circuit further stops at least one of storing the parallel data in a memory of an aligner circuit and reading the memory based on a channel bonding signal generated based on a channel bonding symbol in the serial data. Further, the secondary link circuit outputs the channel bonding signal to an finite state machine (FSM) circuit of the primary link circuit and pause reading the memory, and resume reading the memory and output the parallel data based receiving a read signal from the FSM circuit of the primary link circuit.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 28 shows a diagram of a receiver subcore.

To facilitate understanding, identical reference numerals, or superscripted/subscripted versions of the same, have been used, where possible, to designate identical and/or similar elements that are common to the figures.

DETAILED DESCRIPTION

Figure 1:
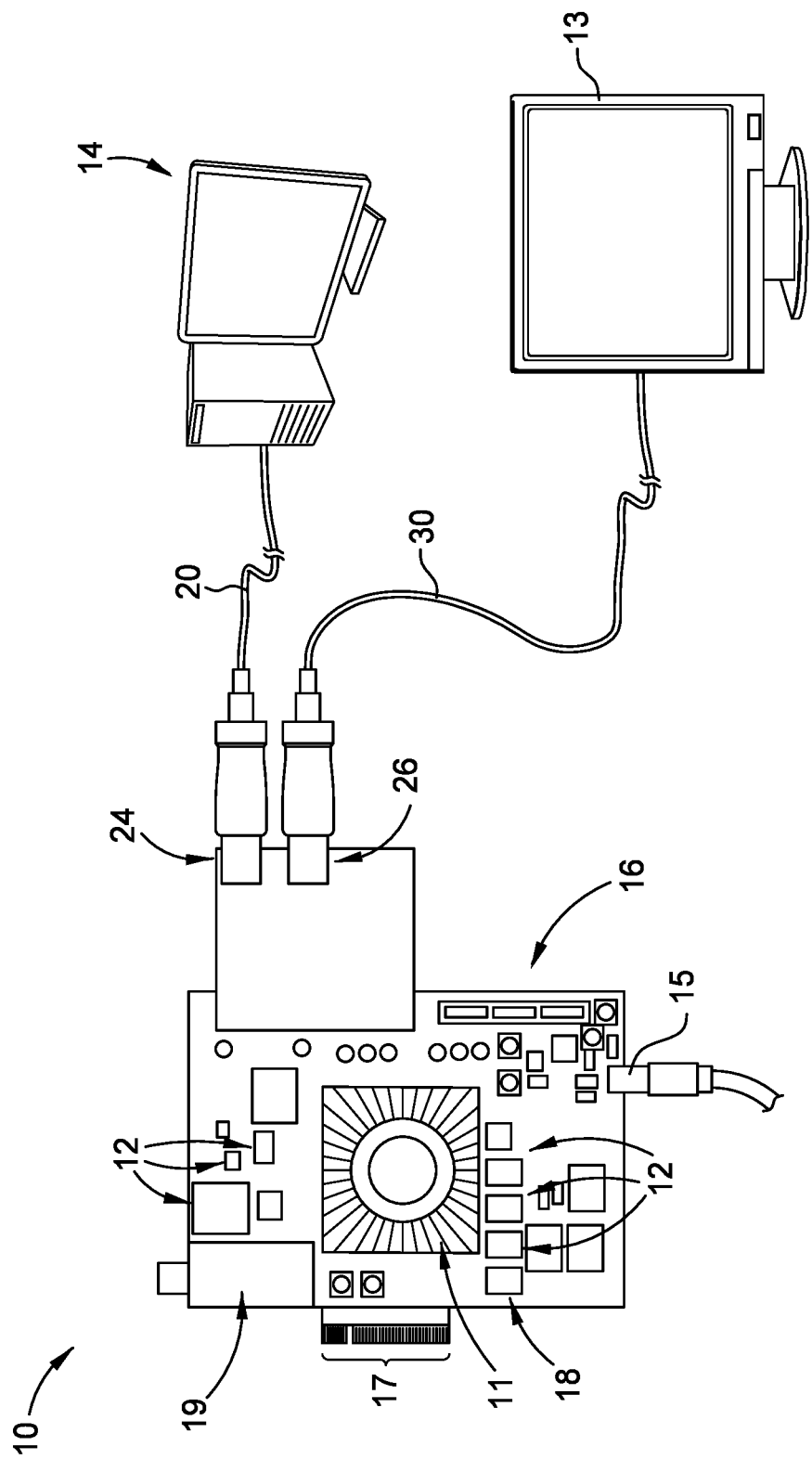
FIG. 1 shows a video system employing the system, apparatus and methods.

To facilitate a clear understanding of the present disclosure, illustrative examples are provided herein which describe certain aspects of a communication system. However, it is to be appreciated that these illustrations are not meant to limit the scope of the present disclosure and are provided herein to illustrate certain concepts associated with the communication system of the present disclosure.

Communication systems include high-speed serial link protocols to provide the transmission of high-speed serial data streams between elements (e.g., transmitter circuitries and receiver circuitries) within the communication system. For example, a communication system includes transmitter circuitry and receiver circuitry, and employs one or more high-speed serial links between the transmitter circuitry and the receiver circuitry. Parallel data from one data subsystem is serialized by transmitter circuitry (TX) and presented to one or more multiple high-speed serial links. The data is transmitted serially and subsequently received and reassembled at receiver circuitry (RX). The receiver circuitry deserializes the data back to parallel data. Such a communication system that serializes parallel data for transmission and deserializes the received data may be referred to as a Serializer/Deserializer (SerDes) communication system. In a SerDes communication system that employs multiple high-speed serial links, the parallel-to-serial and serial-to-parallel conversions occur per serial link and independently of one another. In one or more examples in the process of data reassembly, data synchrony at the receiver circuitry is often lost when employing a high-speed transmission protocol due to static phase errors between the serial links, non-uniform cable lengths, and/or physical link delays. Further, the number of serial links between the transmitter circuitry and the receiver circuitry determines the overall serial transmission bandwidth. In one or more examples, the transmission bandwidth can vary between communication protocols depending on the total maximum bandwidth needed for any particular application.

The communication systems employ a clock synchronous protocol to reduce errors in the differences in the clock signals between different elements within the communication system. For example, a clock signal pulse may be sent from a first device to a second device within the communication system. In such a communication system, the first and second devices are synchronized with the same clock signal. In self-synchronous serial communication protocols, a clock signal is embedded into the serialized data streams by the transmitter circuitry. Encoding, such as 8b/10b, 64b/66b, with scrambling, is used to generate transitions in the serial transmission data pattern so that the receiver circuitry can extract the clock signal from the data. Independent "link processing circuitries" exist within each of the multiple serial links. The link processing circuitries perform various operations such as "channel encodings," "scrambling of link data," and/or "inter-link alignment."

In a SerDes communication system the per link parallel data from the transmitter contains certain inter-link alignment data. For example, a specific control character is generated by the communication system that appears on all the links at the same time so as to provide proper output order of the corresponding data distributed among the multiple links. When each link presents the same inter-link alignment data to the receiver protocol engine at the same time, the associated data is properly decoded by the receiver protocol engine and data integrity is maintained. However, if one or more of the serial links presents inter-link alignment data at a different time than another serial link, and/or different inter-link alignment data than another serial link, the serial links are not synchronized, and errors within the received data may occur. Non-synchronized serial links may produce skew within input data at the corresponding receiver circuitries.

The process of synchronizing multiple serial links in higher bandwidth applications is called "channel bonding." To assist this channel bonding process, the transmitter circuitries in high speed transmission protocols transmit a special "channel bonding character" or "channel bonding symbol" at a fixed frequency. The channel bonding character is received and used by the receiver circuitry to achieve the synchronization and alignment of skewed input data. This communication system described here presents a circuit for channel bonding through which the alignment at the receiver circuitry can be achieved with minimal logic resources and decreased latency compared to existing conventional techniques of channel bonding.

In one or more examples, the communication system of the present disclosure employs a 2-bit hand-shake mechanism between the "Leader" (or primary) and a "Follower" (or secondary) to conserve significant resources within the FPGA. These resources include the number of additional circuits needed to implement all the FIFO pointers, the relative delays introduced by the processing of the FIFO pointer data, and the serial delays in transmitting those values between link processing circuitries. In particular, large resources are needed to implement the "up counters" to track inter-lane skew values (in terms of clocks). Further, the usage of a single signal to resume the memory reads reduces significantly the latency involved with the "distributed approach."

In one or more examples, the communication system of the present disclosure employs a primary processing circuit and secondary processing circuits that use a 2-bit hand-shake mechanism to align the serial links of the communication system. Such an alignment mechanism utilizes less resources than conventional alignment mechanisms. These resources include the number of additional circuits needed to implement all the FIFO pointers, the relative delays introduced by the processing of the FIFO pointer data, and/or the serial delays in transmitting the values between link processing circuitries. In particular, the alignment mechanism described herein omits the use of "up counters" that are used by conventional alignment mechanisms to track inter-lane skew values (in terms of clocks, further reducing the resources used to implement the alignment mechanism described herein. Further, the alignment mechanism described herein uses a single signal to control reading data from the buffers of the transmitter and/or receiver circuitries, reducing the latency as compared to conventional alignment mechanisms.

It is also to be understood that the techniques described here may be implemented in various forms of hardware, software, firmware, special purpose processors, or a combination thereof. In some examples, the techniques of the present disclosure are implemented in a FPGA designed using a software suite design package to configure specific hardware circuits. The design programs may be uploaded to, and executed by, a machine comprising any suitable architecture. The machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code, configured hardware or part of the program (or combination thereof) which is executed via the operating system of the computer platform. In addition, various other peripheral devices may be connected to the computer platform such as an additional data storage device and a printing device.

It is to be understood that, because some of the constituent system components and method steps depicted in the accompanying figures are preferably implemented in software, the actual connections between the system components (or the process steps) may differ depending upon the manner in which the present features of the present disclosure are programmed. Specifically, any of the computers or devices may be interconnected using any existing or later-discovered networking technology and may also all be connected through a lager network system, such as a corporate network, metropolitan network or a global network, such as the internet.

The entire description below is provided in the particular context of a video protocol and standard, specifically DisplayPort™. However, the features and techniques of the present application is generally applicable to any video display systems and is protocol agnostic. Further, the techniques and features described herein are generally applicable to the synchronization of any multiple-streamed serialized data within any high-speed transmission system.

As shown in FIG. 1, a display system 10 is provided including a display device 13, a display generation system 14 and a data transport element 16. In the example of FIG. 1, circuit board 18, having a backplane interface 17, is shown as data transport element 16. Serialized data is generated by the display generation system 14, transported over serial transmission cable 20 to the serial receiver 24. Serialized data received at the serial receiver 24 is then processed by the numerous integrated circuits (ICs) 12 included as part of the design of circuit board 18. In modern-day systems requiring heavy data processing requirements, field-programmable gate arrays (FPGAs) 11 may be used as building blocks of the circuitry on circuit board 18 and in connection with the other ICs on that board. The processed data is then transported off circuit board 18 via the serial transmitter 26 over serial transmission cable 30 and on to display device 13 for visual perception.

It should be appreciated that one of the primary reasons for introducing a transport element is to add data processing to the data streams (e.g. for encryption) or to convert from a first data transmission protocol to a second data transmission protocol through the use of the two transmission/receiving interfaces of serial receiver 24 and serial transmitter 26. The transport element may be accessed by USB interface 19 for programming purposes and provided power through the backplane interface 17 or via a separate input power connection 15.

FPGAs 11 may be used to implement the programmable circuit logic, according to one or more examples. In particular, the FPGA 11 includes a large number of different programmable tiles including transceivers, configurable logic blocks ("CLBs"), look-up tables ("LUTs"), random access memory blocks ("BRAMs"), input/output blocks ("IOBs"), configuration and clocking logic ("CONFIG/CLOCKS"), digital signal processing blocks ("DSPs"), specialized input/output blocks ("I/O") (e.g., configuration ports and clock ports), and other programmable logic such as digital clock managers, analog-to-digital converters, system monitoring logic, and so forth. The FPGA can also include PCIe interfaces, analog-to-digital converters (ADC), and the like.

In some FPGAs, each programmable tile can include at least one programmable interconnect element ("INT") having connections to input and output terminals of a programmable logic element within the same tile. Each programmable interconnect element can also include connections to interconnect segments of adjacent programmable interconnect element(s) in the same tile or other tile(s). Each programmable interconnect element can also include connections to interconnect segments of general routing resources between logic blocks. The general routing resources can include routing channels between logic blocks comprising tracks of interconnect segments (e.g., interconnect segments) and switch blocks for connecting interconnect segments. The interconnect segments of the general routing resources (e.g., interconnect segments) can span one or more logic blocks. The programmable interconnect elements taken together with the general routing resources implement a programmable interconnect structure ("programmable interconnect") for the FPGA.

Figure 2A:
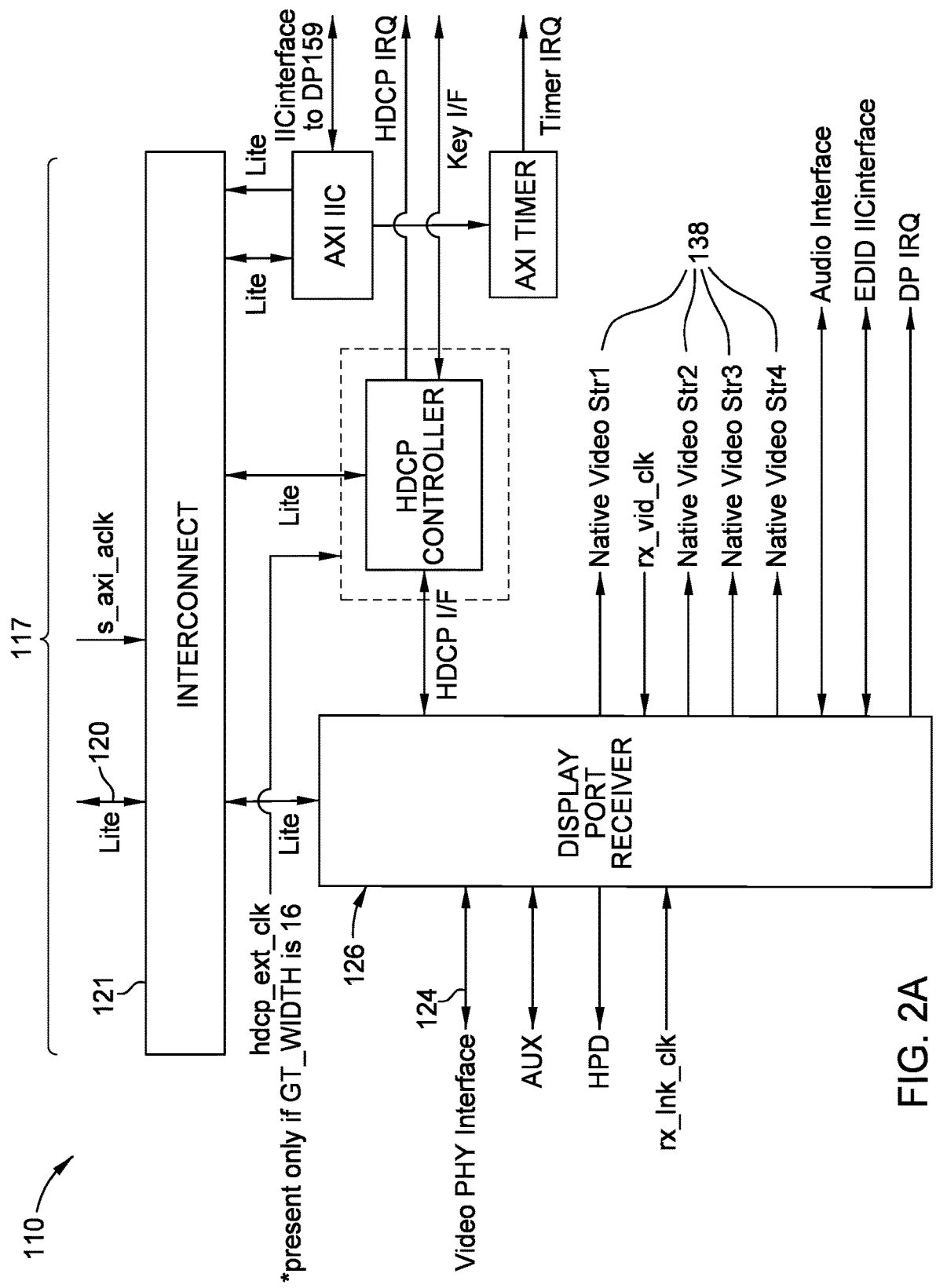
FIG. 2A shows a diagram of a receiver subsystem.
Figure 2B:
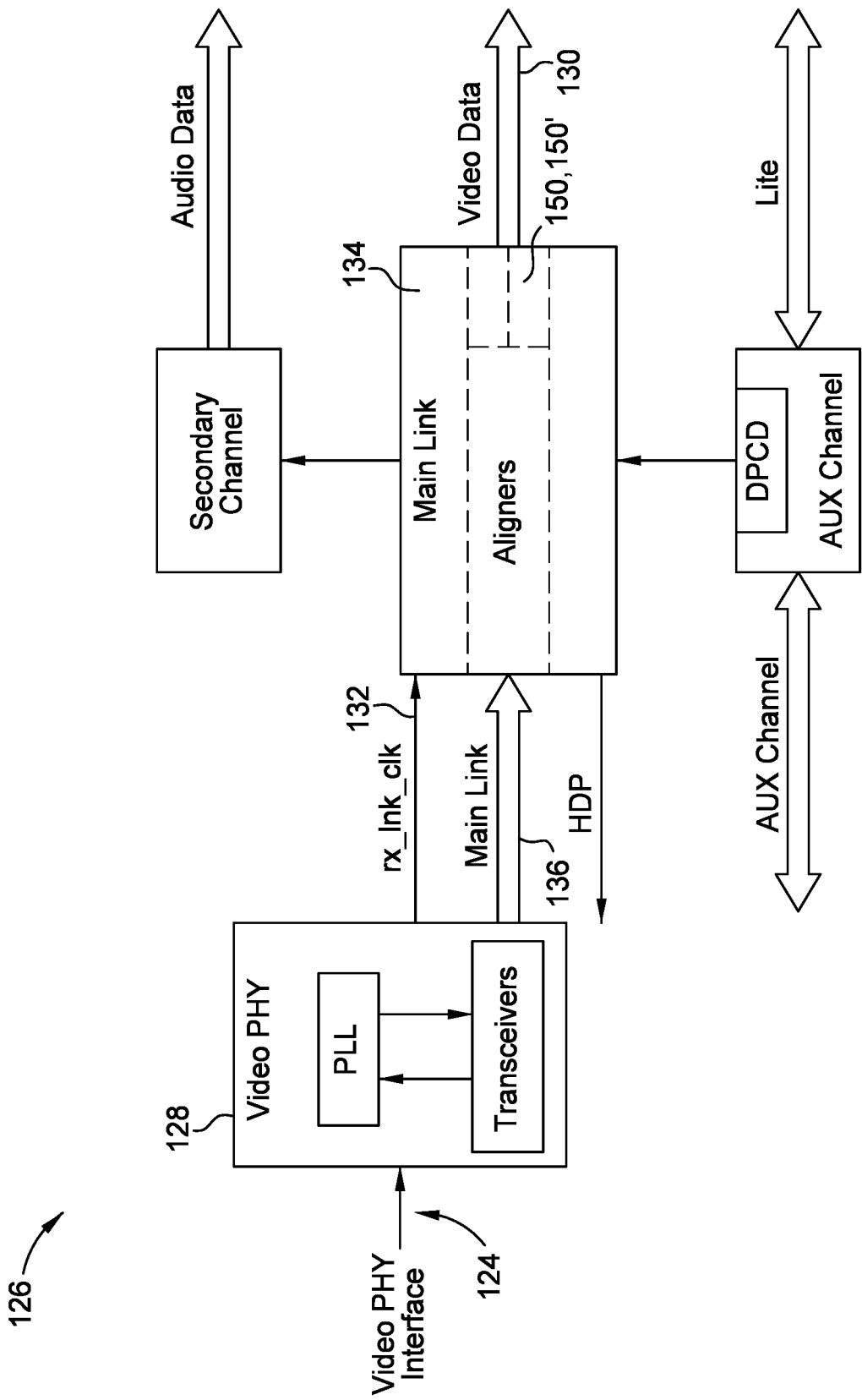
FIG. 2C shows a diagram of a receiver aligner circuit.
Figure 2C:
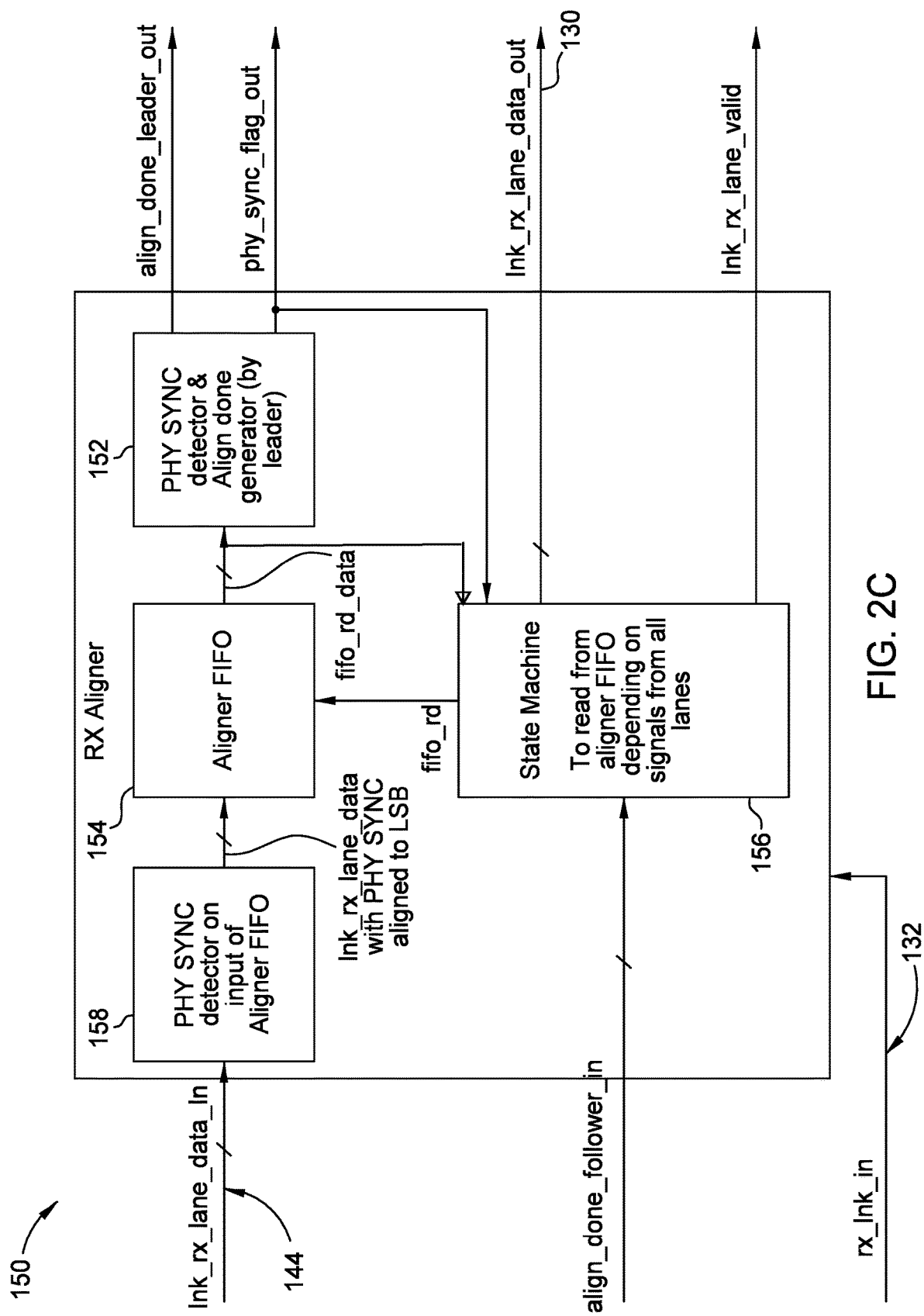

Drilling down into the FPGA in FIGS. 2A-2C, a DisplayPort™ RX subsystem 110 is shown as a preconfigured plug-in solution, generated by the FPGA IP library programming, for serial digital video data reception in a large video system. The FPGA programming interface used to create the DisplayPort™ RX subsystem 110 provides for ease of use in selecting among different design modes with automated customization. Because the DisplayPort™ RX Subsystem is hierarchically-packaged, a variety of parameters within the subsystem may be selected to create the required hardware. As shown, the DisplayPort™ RX Subsystem is a full-featured, hierarchically packaged FPGA subsystem with a DisplayPort™ receiver, RX subcore 126 ready to use in large video system applications. Particular implementations may support video resolutions of up to Full Ultra HD (FUHD) at 30 fps.

FIG. 2A shows a DisplayPort™ RX subsystem 110 that takes input video stream on serial link bus 124, processes that video stream, and outputs that video stream in two different video stream formats. Also as shown, a native video interface is programmed and implemented, and the subsystem is packaged with two primary subcores: DisplayPort™ RX subcore 126 and an interface controller subcore 117. The Display Port RX receives the input video stream using the DisplayPort™ protocol over a 16-bit video PHY interface, on serial link bus 124 and outputs i) four native video streams 138 or ii) a predefined standard, multi-pixel video stream 120 using predefined standard interconnect interface 121.

FIG. 2B shows the DisplayPort™ RX subcore 126. The DisplayPort™ RX block is delivered as part of the DisplayPort™ RX Subsystem 110 and contains subcomponent circuits as described below. A video PHY interface, transceiver 128, implemented as a hardened circuit, block transceiver on the FPGA board, converts the serial data from the serial link bus 124 to parallel data output on main link bus 136. Receiver (transceiver) link clock is extracted by transceiver 128 from the serial input serial data stream and output on receiver link clock bus 132. Circuitry constituting main link 134 includes the following circuitry. A leader aligner 150 and one or more follower aligners 150'. Main link 134 accepts, as inputs, parallel video data from main link bus 136, and outputs a primary video stream on video data bus 130. Finally, secondary channels may also be provided for processing audio data components extracted from the input video stream. Configurable provisions may also be used to provide for a dedicated source input to synch communications channels as well as providing and DisplayPort™ configuration data.

FIG. 2C illustrates a physical depiction of the aligner circuit 150, implemented as a FPGA circuit block and according to an example. Aligner circuit 150 is replicated multiple times within main link 134 corresponding to the number of serial streams (lanes) provided on the interface—serial link bus 124. Parallel data provided on main link bus 130 of FIG. 2B is input to aligner circuit 157 at the link on lane data bus 146. IN put serial data on 144 corresponds to the video PHY 124 of FIG. 2B. The PHY SYNC detector on input of aligner FIFO 158 corresponds to parallel transceiver 128 of FIG. 2B, which in turn, provides parallel data to aligner FIFO 154.

The channel bonding process by which the inter-link alignment is achieved is performed within aligner FIFO 150.

The previously-indicated alignment or channel bonding symbol(s) are used to accomplish this. When sending data across multiple lanes, propagation delays will cause each receiving lane at the receiver to see data arriving at different times.

Depending on the application, it might be necessary to align the data on one or more of the lanes at the receiver. The elastic buffer in each receiving lane at the receiver that is used for clock correction is also used for channel bonding. Channel bonding requires that a special alignment character be chosen and reserved such that it is not duplicated elsewhere in the data stream. Each serial link will have one leader lane, with the rest being considered followers. On the transmitter side, the leader and followers all transmit the channel bonding character simultaneously. When the leader receiver sees the channel bonding sequence in a certain location of the elastic buffer, all followers are instructed to find their bonding sequence. In certain implementations, the read pointers of all elastic buffers are adjusted to the offset of the channel bonding sequence location. Because each data lane has its own offset for its own elastic buffer, the receiver can read from different locations of each elastic buffer, resulting in the reading out aligned data once bonding is achieved.

Figure 3A:
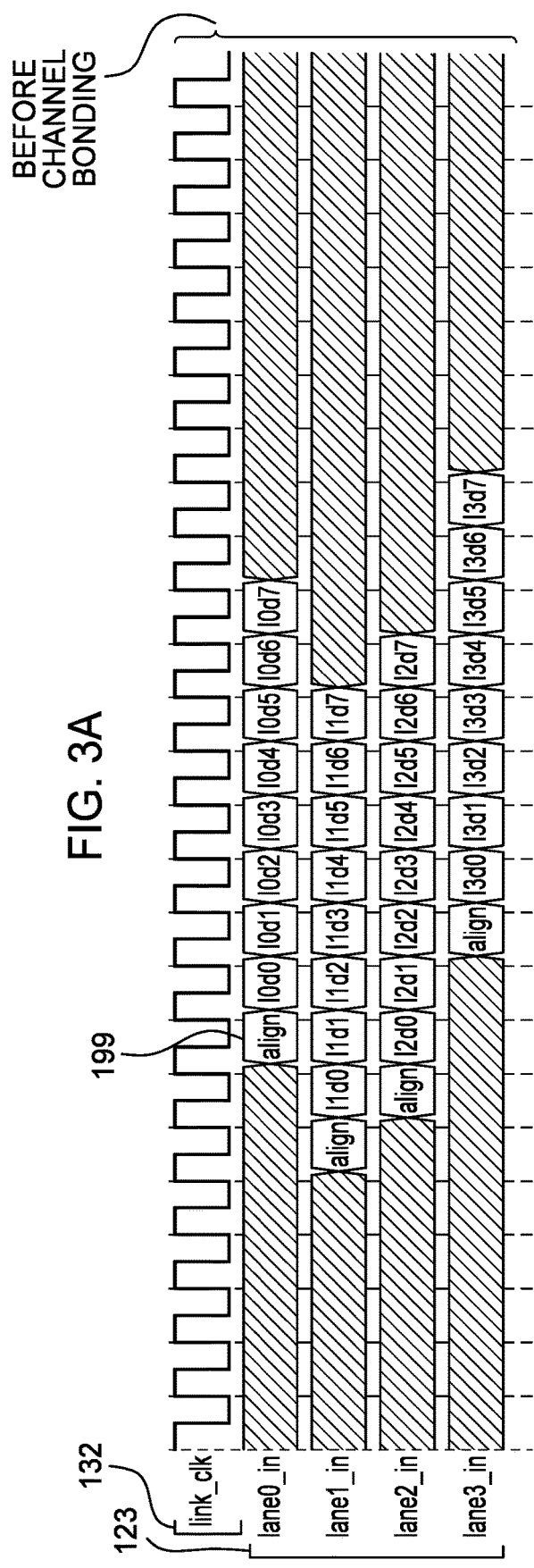
FIGS. 3A and 3B show data diagrams illustrating the processing performed by an aligner circuit.
Figure 3B:
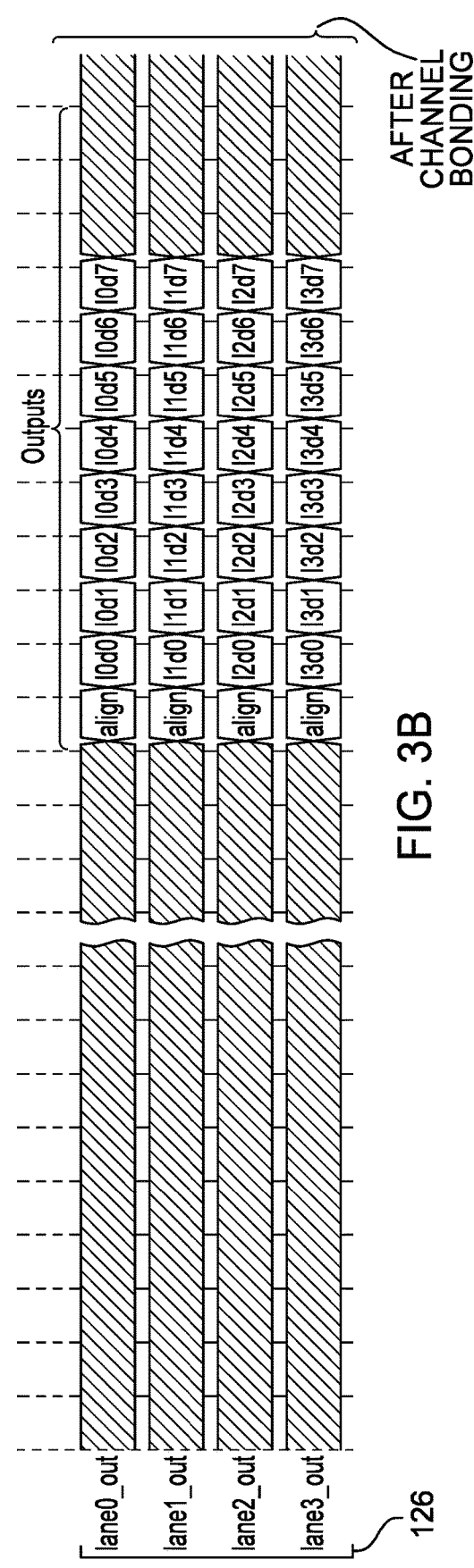

FIGS. 3A and 3B are illustrative of the case in which 4 links of serial data ("lanes") are presented to the RX subsystem 110 at serial receiver 24 and on PHY interface, serial link bus 124. The aligned output serial data are shown as output from RX subsystem 110 at serial transmitter 26. As part of overall RX subsystem 110 and the operation, these data are converted to parallel data by transceiver 128, presented to main link 134 and aligner circuits 150, 150' etc. which are output again as parallel data on main link bus 130 and converted by another transceiver (not shown) for presentation to output serial transmitter 26. For the purpose of illustration simplicity, the serial nature of the data is shown to more clearly illustrate the inter-link skew that is corrected with the system and method described herein.

In FIG. 3A, the input set of serial signals are label with names lane0_in, lane1_in, lane2_in, lane3_in as the set of links each holding the parallel data after serial-to-parallel conversion at transceiver 128. Lnk_clk is the extracted clock corresponding to each of the links and as presented to leader aligner 150 on clock bus 132. An alignment symbol 199, depicted as "align" in FIG. 3, is transmitted between data words at regular intervals on each link—i.e. lanes[0:3]. The alignment symbol represents the special channel bonding symbol needed to align the lanes. Each of the individual data segments or words, l0, l1, l2, etc. within the transmission stream on each link are labeled as such with the corresponding data bits within each segment labelled l0d0, l0d1, l0d2 etc. A data word is the sequence of data symbols/segments between each align symbol (i.e. <align>+l[n]d[0:7]).

With correct alignment and without skew, the alignment symbols should appear on the same clock on each of the links. Providing this, data segments d0, d1, d2, etc. and the corresponding associated data words would necessarily also begin and end on the same clock cycles. However, due to inter-lane skew, the alignment symbols and data segments appear at random times on different links. FIG. 3B depicts the arrangement of the lane data 126 after alignment using the system and method described herein.

Figure 4A:
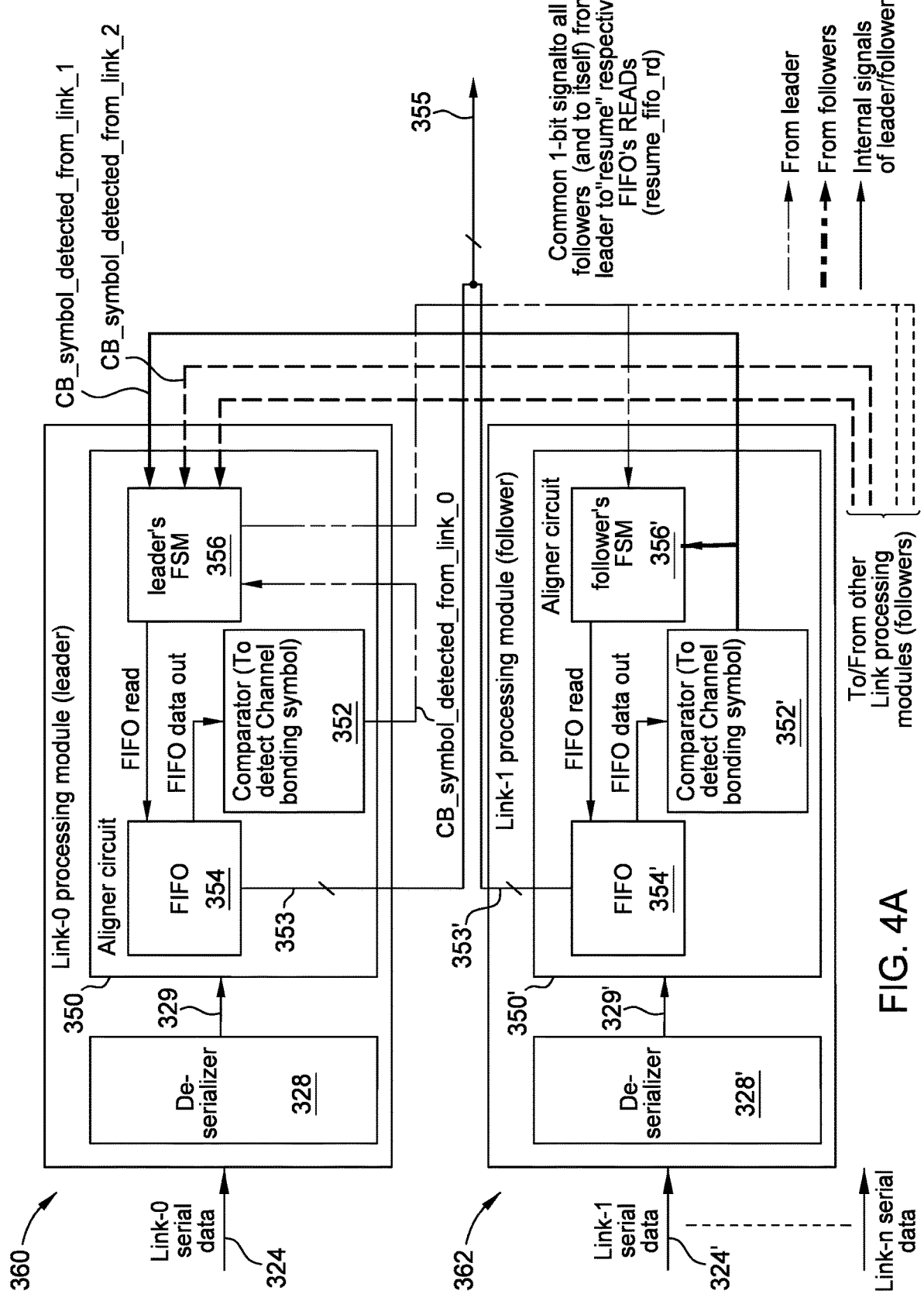
FIG. 4A shows a generic, logical arrangement of hardware programming circuitries used to implement an aligner circuit for a DisplayPort™ interface.
Figure 4B:
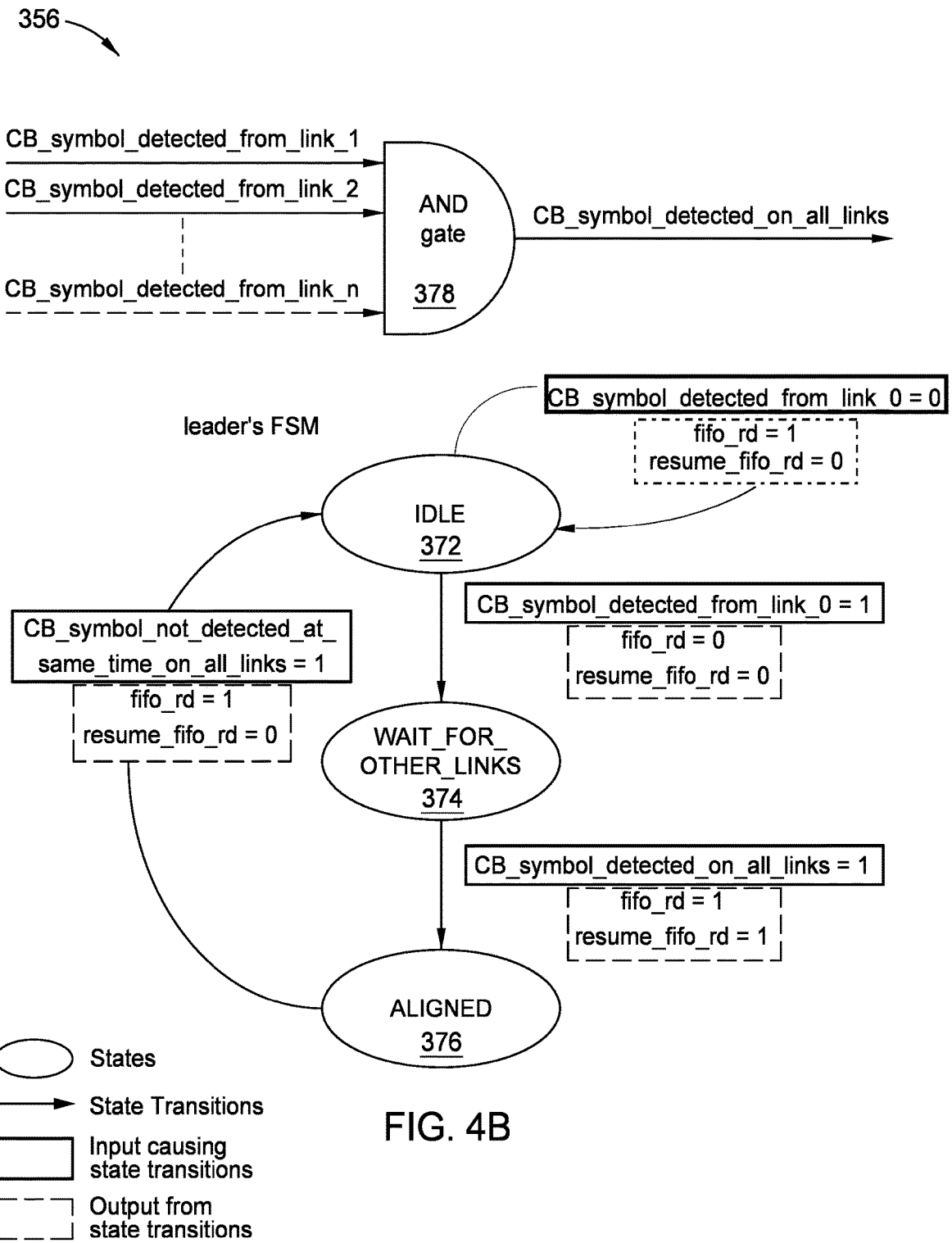
FIG. 4B shows logical arrangement of hardware programming circuitries used to implement a leader finite-state-machine (FSM).
Figure 4C:
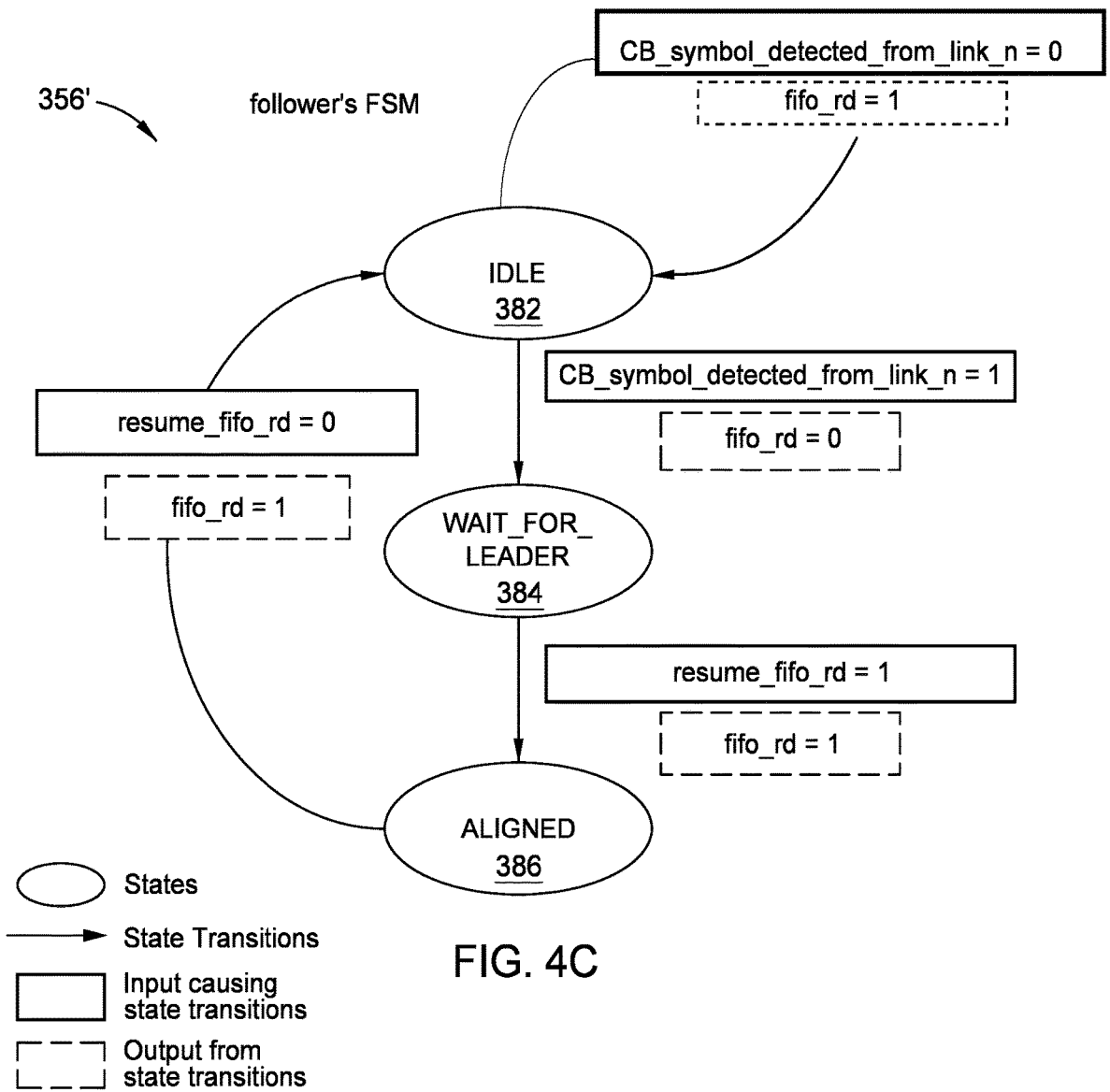
FIG. 4C shows logical arrangement of hardware programming circuitries used to implement the follower FSM.

FIGS. 4A-4C illustrate a "modular" depiction and description of the aligner circuits, according to one or more examples. The modular depiction reflects the IP library-based approach to programming FPGAs and the availability of a plurality of library components that may be used to implement the various components, aspects and variations, according to one or more examples. Those of skill in the art will realize that each "circuitry" so-selected and programmed as a circuit on the FPGA results in the creation of actual circuitry and hardware with corresponding signal traces connecting the various components. Signals generated by the circuitry are conveyed among these traces and the circuitry components within the FPGA. In addition to discreet circuits and components, the IP libraries includes circuitries for implementing more complex structures such as memories, flip-flops and system control components. One such modular structure is a finite-state-machine (FSM)—a FSM being an abstract machine that can be in exactly one of a finite number of states at any given time. The FSM changes or transits from one state to another in response to inputs that force the state machine change from one state to another. FSMs are all programmable in hardware circuitry and as selected by the IP programming libraries of configurable FPGA circuits.

FIG. 4A is a generic, logic-based, representation of the actual aligner circuit for a display port interface as provided in FIG. 2C. FIG. 4A shows two link processing circuitries, a leader link processing circuitry 360 and a follower link processing circuitry 362. Each link processing circuitry includes a deserializer at its front end. Leader de-serializer 328 and follower de-serializer 328' convert serial data to parallel data after being input on corresponding leader serial link 324 and follower serial link and 324' respectively. The de-serializer corresponds generally to the circuitry associated with transceiver 128 of FIG. 2B and the PHY SYNC detector 158 of FIG. 2C. Also, leader serial link 324 and follower serial link 324' correspond generally to the data links associated with the respective link portions of serial link bus 124. Each link processing circuitry further includes a leader aligner circuit 350 and a follower aligner circuit 350' each coupled to the de-serializer and receiving the parallel data therefrom on leader data bus 329 and follower data bus 329' respectively. Leader aligner circuit 350 and follower aligner circuit 350' correspond generally to the circuitry associated with the aligner circuit 150 of FIG. 2C. Aligner circuit outputs various state machine control signals to operate the state-machines as further described below.

Generally, deserializers that convert serial to parallel data may be one of two types. Regarding the first type, the deserializers accepts serial input data and "blindly" converts serial to parallel data, without regard to symbol boundaries or the presence of alignment characters. Regarding the second type, the deserializer continuously monitors the input serial data stream and upon the detection of a special multi-bit symbol (e.g. a channel bonding symbol) on the incoming serial data, the serial data is converted into parallel data such that special multi-bit symbols appear in their entirety in a single clock on the parallel data. The second type is that provided in the example of the circuit at 328 and 328'.

As respectively designated by the base reference numeral in the leader processing circuitry and the prime reference numeral in the follower processing circuitry, each aligner circuit includes the following components. A memory (FIFO) 354 comprises a first data stage of leader aligner 360. FIFO 354 correspond generally to the aligner FIFO memory 154 of FIG. 2C. FIFO 354 accepts and stores parallel data from leader data bus 329 according to the data stream clock rx_link_clk on clock bus 132 of FIG. 3A (not shown in FIG. 4A). FIFO 354 advances data within the memory and outputs parallel data on leader bus 353 according to "fifo read" signals within each aligner circuit and under the control of the state machine control signals as further described below. A circuit named leader comparator 352 comprises a first control stage of the aligner circuit 350. Leader comparator 352 takes the parallel data from FIFO 354 on the same clock cycle as the data appears in the output registers of FIFO 154. Leader comparator 352 then processes the symbol to recognize and extract channel bonding symbols within the data. Leader comparator 352 corresponds generally to PHY Sync detector and align done generator (by leader) block 158 depicted in FIG. 2C. This comparator (per each link's circuit) is responsible in detecting "channel bonding" symbol on the FIFO's output of its own link circuit, which leads to the pause of that FIFO's read signal until all the link circuit's gets their own channel bonding characters out of their own FIFOs.

In one or more examples, the overall system FSM is implemented by the discrete circuit components leader FSM 356 and follower FSM(s) 356'. The leader and follower FSMs are each their own finite-state-machines implemented in circuitry contained within and associated with leader aligner circuit 350 and follower aligner circuit 350' respectively. The leader FSM 356 accepts as inputs various state machine control signals, including a channel bonding signal emitted by comparator 352 (representing the detection of the channel bonding symbol by the comparator), and outputs other state machine control signals, including its own FIFO read signal and "resume FIFO read" signal, the latter ultimately driving the reading of data from the follower FIFOs. The system transitions associated with all these state machine signals is described in operational detail below with respect FIGS. 4B and 4C. The system FSM signaling as between leader FSM 356 and follower FSM 356' is shown with the signal label designations in FIG. 4A. The intra-FSM signaling as within the leader FSM and follower FSM 356' is illustrated within the state machine descriptions provided in connection with FIGS. 4B and 4C.

FIG. 4B shows a leader FSM 356 according to one or more examples. Leader FS consists of three states: leader idle 372, wait_for_other_links (WFOL) state or leader wait 374 and leader aligned state 376. The leader FSM operates according to the following leader FSM variables which can assume the corresponding indicated values:

TABLE 1

Leader FSM state variables

| State Signal Name<br>(input/output [I/O] signal;<br>internal generated signal [G]) | State<br>Signal<br>Values |
|---|---|
| CB_symbol_detected_from_link_N;<br>N = 0 to link number-1<br>(I - to AND gate for N = 1 to #links-1)<br>(I for N = 0) | 0/1 |
| CB_symbol_detected_on_all_links<br>(O from AND gate) | 0/1 |
| CB_symbol_not_detected_at_same_time_on_all_links<br>(G) | 0/1 |
| fifo_rd<br>(O within leader FSM) | 0/1 |
| resume_fifo_rd<br>(O within leader FSM and to follower FSM) | 0/1 |

Leader FSM further includes FPGA circuitry implementing AND gate 378. AND gate 378 accepts as inputs each of the CB_symbol_detected_from_link_N signals (N=1 to #links−1) from each of the one or more follower comparators 352'. AND gate 378 outputs a state machine signal CB_symbol_detected_on_all_links. When CB_symbol_d- etected_on_all_links=1, all the follower aligner circuits are bonded and their respective FSMs are in an aligned state.

Leader FSM further generates a CB_symbol_not_detected_at_same_time_on_all_links internally to the leader FSM. This signal, which is value-inverted, indicates that either one or more of the follower comparators or the leader comparator itself is out of alignment, and assumes a value of "1" in such state. In simple operation, the AND gate 378 outputs a "1" when all input state machine variables CB_symbol_detected_from_link_N (N=1 to #links−1) are all "1". The CB_symbol_detected_from_link_N (N=0−#links−1) transits to "0" because the aligner circuit comparators of Link-N does not detect alignment symbols. Finally, leader FSM takes as inputs CB_symbol_detected_from_link_N from all of the links and when its own "CB_symbol_detected_from_link_N" is 1, it checks if all the other "follower" link "CB_symbol_detected_from_link_N" are 1 or not. If no, then "CB_symbol_not_detected_at_same_time_on_all_links" is asserted to '1'. When CB_symbol_not_detected_at_same_time_on_all_links is a "1" either the leader link circuit and/or one or more of the follower link circuits are not in alignment and have received a bonding character in a non-synchronous time clock transition.

FIG. 4C shows a follower FSM 356' according to one or more examples. Follower FSM includes three states: follower idle state 382, wait_for_leader (WFL) 384 and follower aligned state 386. The follower FSM operates according to the following follower FSM variables which can assume the corresponding indicated values:

TABLE 2

Follower FSM state variables for each link N

| State Signal Name<br>(input/output [I/O] signal) | State<br>Signal<br>Values |
|---|---|
| CB_symbol_detected_from_link_N;<br>N = 0 to #links-1;<br>(O) | 0/1 |
| resume_fifo_rd<br>(I) | 0/1 |
| fifo_rd<br>(O - internal to follower FSM) | 0/1 |

A brief summary of the overall operation of the system FSMs is now presented in advance of describing the specific state transitions of each FSM machine that implement the channel bonding. Again, the system and features described herein are directed to an improved "channel bonding" technique in which time-consuming and complicated communication of relative skew difference value among the link processing circuitries is eliminated. Instead, this technique relies on a "leader-follower" arrangement in which only a two-bit handshake mechanism is used between each of the follower link processing circuitry and the leader link processing circuitry, i.e. the "resume fifo read" from the leader and the sum of the "channel bonding signals" (CB_symbol_deteted_from_link_N) generated within each aligner circuit. Dedicated FIFOs in each of the link processing circuitries (leader and followers) store respective input and unaligned data. One of multiple link processing circuitries is selected as "leader". The link processing circuitry, that is present in all the link configurations, is selected as "leader". In the example of the DisplayPort™ implementation, there are three possible link configurations: 1, 2 or 4 links. In this example, link-0 would act as "leader" and the remaining links would be "followers."

Upon receiving the "channel bonding character" at its respective comparator, each of the link processing circuitries (leader and followers) pauses the read of their own internal FIFO. All the followers pass an indication to the leader that the channel bonding symbol was received on the link. This is done using a single bit signal to indicate that the channel bonding symbol is present (i.e. "1; CB_symbol_detected_from_link_N). The absence of any channel bonding symbol on a link processing circuitry at a synchronous clock transition results in the leader link processing circuitry to continues to suppress the "resume FIFO read" signal. In this state, non-aligned aligner circuits (leader and follower) continue to issue "read FIFO" signals internally until each comparator registers that an alignment character is read in. Once the channel bonding symbol has been received into the comparator, the FIFO read signal for that aligner circuit is suppressed and the FIFO reads therefrom stop. Once the channel bonding symbol has been received at the comparator within each link processing circuitry, including the leader, the leader link processor issues a single bit signal command ("resume FIFO read"), which is received and interpreted by each link circuitry, including the leader, as a "resume" signal that permits the FIFO reads across all aligner circuits to continue. In this manner, the FIFO resume data command is received simultaneously by all link circuitries. Absent any further skew, the links will process in synchrony, the data issues from the FIFOs in alignment and "channel bonding" is achieved. After achieving the "channel bonding", the FIFOs are allowed to output the data in synchrony and the leader continuously tracks the "channel bonding detected signals" (i.e. CB_symbol_detected_from_link_N) from each of the links. If any of the links become out of alignment, in that channel bonding characters are not received at the comparators within the link circuitries simultaneously with other link's comparators, the alignment process starts all over again. In this manner a 2-bit handshake mechanism between leader and each of the follower is used to achieve the "channel bonding."

The system specific FSM operation is now presented as implemented by the leader and follower FSMs. As mentioned in the summary, the overall system's ideal static condition is one of alignment, i.e. the system persists in a state in which each link of the output serial data is aligned and all lanes are channel locked. In this system state, both the leader FSM 356 and the follower FSM 356' begin in the leader aligned state 376 and follower aligned state 386 respectively. Resume_fifo_rd is generated by the leader FSM and output to itself and to each of the follower FSMs. This causes the aligner circuit FSMs to issue fifo_rd signals which result in each word of each FIFO to read out as aligned words, in parallel, onto leader bus 353 according to the clock signals provided to the link processing circuitries.

Referring first to the follower FSM of FIG. 4C, when data jitter or data skew occurs as between one or more of the lanes, a misalignment of align symbols is presented as between leader data bus 329 and follower data bus 329' (FIG. 4A). In a practical sense, one of leader data bus 329 and follower data bus 329' will not have the align symbol presented as the input to either leader comparator 352 or follower comparator 352' simultaneously. If the non-alignment occurs within the follower link processing circuitry, follower comparator 352' does not detect an alignment symbol as the next input symbol to the comparator circuit. In that case, follower comparator 352' changes its output signal CB_symbol_detected_from_link_N from "1" to "0." This, in turn, causes at least one of the inputs to AND gate 378 to become a "0" when "CB_symbol_detected_from_link_0" (leader's signal) is "1", causing the CB_symbol_detected_on_all_links signal to go to "0". If the non-alignment occurs within the leader link processing circuitry, leader comparator 352 will not detect an alignment symbol as the last output character from the FIFO when the follower comparator 352' correctly detects the alignment symbol. Therefore, the leader comparator 352 changes its output signal "CB_symbol_detected_from_link_N" to "1" at an inappropriate instance when the follower comparator 352' correctly remains at "0". In either of these two cases, the signal CB_symbol_not_detected_at_same_time_on_all_links="1" is generated by the leader FSM and the leader FSM transits from the leader aligned state 376 to leader idle state 372. Hence, after achieving the first "channel bonding", the non-occurrence of align symbol on all links at the same time is monitored/detected by sensing "CB_symbol_detected_from_link_N" of all the links inside leader circuitries, when "CB_symbol_detected_from_link_0" (leader's own signal) is 1. If any of the "CB_symbol_detected_from_link_N" signals is 0 at this instance, then it is considered as the loss of alignment and hence the leader FSM transits from the aligned state to idle state.

When exiting the aligned state, leader FSM sets the state variable resume_fifo_rd to "0." In the idle state the leader FSM continues to output resume_fifo_rd as "0" which is subsequently output to each of the follower FSMs. When the resume_fifo_rd is input as "0" at each of the follower FSMs, the follower FSMs transit to their follower idle state 382.

Each of the FSMs remain in their respective idle states until the respective CB_symbol_detected_from_link_N is received from its own FSM indicating that an alignment symbol has been received within the comparator associated with that circuit. Until that time the FSM continues to generate its own internal fifo_rd signal such that its FIFO is read out until the alignment symbol is the last stored FIFO value. Upon receiving the next alignment symbol, any of the FSMs transitions to the next state—a wait state. Alternatively, if any of the FSMs already have already received an alignment symbol and are holding on to it at the transition to idle state, that FSM also transitions to the next state immediately.

Once an alignment character is received by its own comparator, the leader FSM transitions to the state leader wait 374 following its state leader idle 372. There, its own internal fifo_rd signal=0 and the FIFO stops reading out. The resume_fifo_rd output remains "0" until all the follower FIFOs continue to read out and the CB_symbol_detected_on_all_links becomes "1" again at which time the leader FSM transitions to its aligned state, outputs fifo_rd=1 to its own FIFO and outputs resume_fifo_rd=1 to each of the follower FSMs.

To conclude the state machine operation, the follower FSMs transition from follower idle state 382 to their WFL 384 state when their own respective comparator presents its CB_symbol_detected_from_link_N=1 and the alignment symbol is received by the comparator for that aligner circuit. From there, the follower FSMs transition to the alignment state upon receipt of the resume_fifo_rd=1 signal from the leader at which time fifo_rd=1 is issued to its own FIFO and the follower FSMs transits back to the aligned state in which all the FIFO read outs are performed in system synchrony and alignment and presented on data busses 353, 353' and 355.

Figure 5:
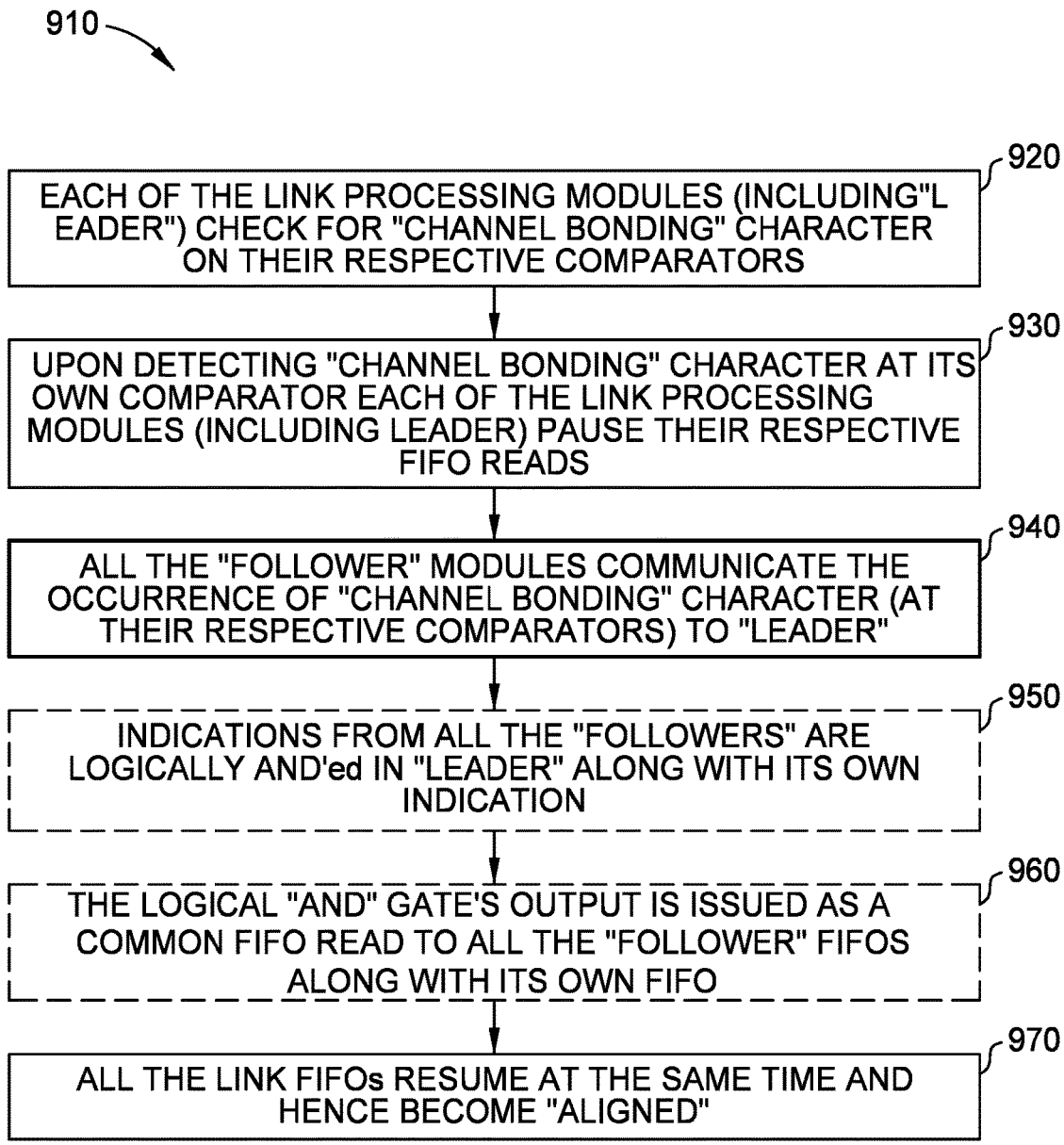
FIG. 5 shows process flow illustrating the method for operating a communication system.

FIG. 5 provides a method 910 for channel bonding and data alignment according to one or more examples. At step 920 the comparators within the leader and follower link processing circuitries each check for a channel bonding character on their respective FIFO outputs. At step 930, "upon detecting the channel bonding character at the output of its own FIFO, each of the link processing circuitries (including leader) pause their respective FIFO reads. At step 940, all the follower circuitries communicate the occurrence of a channel bonding character (on their respective links) to the leader link aligner. At step 950, signals indicating the receipt of a bonding characters from all the followers are logically ANDed along with the indication of receipt of leader bonding character symbol. At step 960, a common, resume FIFO read is issued to all the follower FIFOs as well as to the leader FIFO. And finally at step 970, read FIFO signals are issued within the link processing circuitries and the aligner circuits to perform the aligned read-out of data from each FIFO in the overall system.

circuitries. Finally, each of the link processing circuitries makes use of this relative skew value and adjusts its internal circuitry to remove the skew.

In the distributed approach, each individual link processing circuitry contains internal FIFOs into which the input unaligned data is written. One of the link processing circuitries is selected as "Leader" and it communicates its FIFO's "Read pointer" position value to its adjacent follower circuitry (which is another link processing circuitry). This follower circuitry adjusts its internal FIFO's "Read pointer" according to the "Leader's" position and it again passes the "Leader's" read pointer position to its next adjacent follower and sequentially so on, in serial fashion from one level of follower processing circuitry to the next

TABLE 3 differences between conventional channel bonding and techniques of the present disclosure

| Conventional implementations | Present Disclosure | Advantages with present implementation |
| --- | --- | --- |
| FSM resides in a separate "channel bonding Block" Uses "skew information" in the form of "FIFO read pointer value" or "relative skew difference value;" calculated using counters. Skew elimination: Relative skew using "per lane up-counters" (in channel bonding block) is calculated and the relative delay (because of the skew) is programmed to each of the lane's "Synchronous Delay element" to correct the inter-lane skew. Or FIFO read counters are tracked and manipulated inside each of the link processing circuitries | FSM resides in all lanes but is active in the "Leader" lane Uses "pausing" and "resuming" the "FIFO read" of FIFOs inside each link processing circuitry. Skew elimination: FIFO read in each of the lane's circuitry is paused when "channel bonding symbol" is received for that lane and this indication is communicated to the LEADER block. All these indications are AND in LEADER block and if the AND output is 1, a common "FIFO READ" signal is issued to all the lanes, thereby resulting in aligned output from all the lanes. | No need for a separate block for channel bonding No need to track FIFO read counters, extra programming of "synchronous delay element" or circuitry to count the skew differences No need for "up-counters". No need for calculating relative skew delay. No need to manipulate FIFO "Read Counters". No need for flop-based logic in the form of "synchronous delay element" |

Conventional techniques solving the problems addressed by the techniques of the present disclosure involve the calculation of relative skew difference value for each of the link processing circuitries using one of two techniques: centralized logic or distributed logic. These are briefly discussed below.

In the centralized approach, a centralized circuitry is comprised of the required circuitry to calculate relative skew difference value for each of the link processing circuitries. The skew difference values represent the relative values of the pointers used to index each read FIFO. Separate sets of counters are used and compared after receiving "channel bonding symbols" from each of the link processing circuitries. The respective values of relative skew differences are then passed to each of the link processing circuitries. Inside these circuitries, the input unaligned data is passed through a set of delay flip-flops (sometimes called the "dynamic synchronous delay adjustment circuitry") and associated logic is used to select data from the desired flop stage such that the skew is corrected based on the input relative skew difference value coming from the centralized unit. These different values of relative skew, which are based on the current position of "channel bonding symbol" on each of the link are then communicated to each of the link processing In both above methods, multi-bit valued skew information is shared among the individual link processing circuitries. The value is either FIFO's "read count" value or the relative skew difference value which is used to select a data value for the delay stages. These techniques involve implementing, manipulating and communicating multi-bit counter values which involve additional circuitry resource and latency overheads. These latency overheads increase, particularly in the distributed model, as the number of serial links increase.

The idea of employing only 2-bit hand-shake mechanism between the "Leader" and a "Follower" i.e. hand-shake using "CB_symbol_detected_from_link_N" and "resume_fifo_rd" signals conserves significant resources within the FPGA. These resources include the number of additional circuits needed to implement all the FIFO pointers, the relative delays introduced by the processing of the FIFO pointer data, and the serial delays in transmitting those values between link processing circuitries. In particular, large resources are needed to implement the "up counters" to track inter-lane skew values (in terms of clocks). Further, the usage of a single signal (resume_fifo_rd) to resume the FIFO READs reduces significantly the latency involved with the "distributed approach."

TABLE 4

Latency comparison between conventional method and the techniques of the present disclosure

| Channel bonding method | Maximum relative skew between links (S) (symbol clocks) | Number of symbols between consecutive Channel bonding characters received on each link (N) (symbol clocks) | Fixed latency of the circuit for processing and registering the outputs (F) (symbol clocks) | Total Latency to achieve inter-lane alignment (L) (symbol clocks) |
|---|---|---|---|---|
| Conventional method (i.e. adjusting buffer read pointers) | 4 | 125 | 5 | Formula: L = (S * N) + F or (4 * 125) + 5 = 505 |
| Present Disclosure | 4 | 125 | 5 | Formula: L = N + S + F or 125 + 4 + 5 = 134 |

In the conventional methods, on each occurrence of the "channel bonding" character, the read pointer of each link's buffer is adjusted by a value in the alignment circuit. Then the circuit waits until next "channel bonding" character to check for the alignment. If it is not achieved, the buffer pointer is further adjusted by a value and this process continues until the alignment is achieved. Thus, in the calculation of clock cycle latency, the total latency (L) calculation of conventional methods involves S*N. This overhead and latency is eliminated by the approach described in the current disclosure by obtaining the alignment in just one iteration of the "channel bonding" character occurrence.

In the example shown in Table 4, a 4× performance improvement is achieved as compared to the conventional approaches for the specific skew number of S=4. As the skew becomes larger, for example, in higher-speed circuits, the comparative performance becomes better. As an example, if skew number (S) is 8, the performance becomes 8× better.

Furthermore, the low latency performance achieved with by the techniques of the present disclosure becomes more significant in systems involving multiple receiver nodes connected in a daisy-chain fashion. Multiple nodes connected in daisy-chain result in a total latency given by adding up individual latencies between adjacent nodes. An example for such system which is commonly used is "DisplayPort™'s Multi-Stream Transport (MST) mode" for daisy-chain receiver nodes. The latency of the method of the present disclosure does not depend on the skew and does not scale up with the skew, but rather scales down comparatively.

It should be appreciated that the techniques of the present disclosure are protocol agnostic and can be applied to any serial communication protocol. By extending this techniques described here to other communication protocols using similar techniques, either in hardware, software or other programmable fashion, similar advantages may be achieved.

While the techniques described herein have been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

For example the existing circuitry could be programmed within an ASIC instead of an FPGA.

Although various embodiments, which incorporate the teachings of the present disclosure have been shown and described in detail herein, those skilled in the art can readily devise many other varied embodiments that still incorporate these teachings.

While the foregoing is directed to specific examples, other and further examples may be devised without departing from the basic scope thereof, and the scope thereof is determined by the claims that follow.

What is claimed is:

1. A system comprising:
a plurality of link circuits each configured to receive serial data over one or more input serial links, the plurality of link circuits including a primary link circuit and a secondary link circuit, wherein the secondary link circuit comprises:
a de-serializer circuit configured to receive the serial data from the one or more input serial links and convert the serial data into parallel data; and
an aligner circuit comprising a memory, the aligner circuit configured to:
stop at least one of storing the parallel data in the memory and reading the memory based on a channel bonding signal generated based on a channel bonding symbol within the serial data;
output the channel bonding signal to a finite state machine (FSM) circuit of the primary link circuit and pause reading the memory; and
resume reading the memory and output the parallel data based on receiving a read signal from the FSM circuit of the primary link circuit.

2. The system of claim 1, wherein the FSM circuit of the primary link circuit is configured to generate the read signal based on the aligner circuit generating the channel bonding signal.

3. The system of claim 1, wherein the primary link circuit pauses generation of the read signal preventing the output of the parallel data based on the channel bonding signal of the secondary link circuit being received non-simultaneously with a second channel bonding signal of a first link circuit of the plurality of link circuits.

4. The system of claim 1 wherein the FSM circuit of the primary link circuit is configured to:
  transition to a wait state from an idle state based on receiving the channel bonding signal, the read signal is paused in the wait state;
  transition to an aligned state from the wait state based on the channel bonding signal being received from the secondary link circuit and a second channel bonding signal being received from a first link circuit of the plurality of link circuits, and generate the read signal in the aligned state; and
  transition to the idle state from the aligned state based on the channel bonding signal of the secondary link circuit being received non-simultaneously with the second channel bonding signal of the second link circuit.

5. The system of claim 1, wherein an FSM circuit of the secondary link circuit is configured to:
  transition to a wait state from an idle state based on receiving a second channel bonding signal from the aligner circuit; and
  transition to an aligned state from the wait state based on receiving the read signal from the FSM circuit of the primary link circuit; and
  transition to the idle state from the aligned state based on pausing of the read signal by the FSM circuit of the primary link circuit.

6. The system of claim 5, wherein the read signal includes a resume read signal and an associated signal, the resume read signal being transmitted to the FSM circuit of the secondary link circuit as the read signal, wherein the FSM circuit of the secondary link circuit is configured to generate a secondary read signal based on the resume read signal.

7. The system of claim 5, wherein the read signal includes both a resume read signal and an associated signal, the resume read signal being transmitted to the FSM circuit of the secondary link circuit from the primary link circuit, wherein the primary link circuit is configured to generate a primary read signal based on the resume read signal.

8. The system of claim 1, wherein the FSM circuit of the primary link circuit includes an AND circuit, the AND circuit generating the read signal based on receiving the channel bonding signal generated by the aligner circuit.

9. A method for implementing channel bonding, the method comprising:
  receiving, with a de-serializer circuit of a first link circuit of a plurality of link circuits, serial data from an input serial link;
  storing parallel data generated from the serial data in a memory of an aligner circuit of the first link circuit;
  generating, with the aligner circuit, a channel bonding signal based on a channel bonding symbol being present in the serial data;
  outputting the channel bonding signal to a finite state machine (FSM) circuit of a primary link circuit of the plurality of link circuits, wherein the aligner circuit pauses reading the memory based on the generation of the channel bonding signal; and
  outputting the parallel data from the memory of the aligner circuit based on receiving a read signal from the FSM circuit of the primary link circuit.

10. The method of claim 9, wherein the FSM circuit of the primary link circuit is configured to generate the read signal based on the aligner circuit generating the channel bonding signal.

11. The method of claim 9, wherein the primary link circuit pauses generation of the read signal preventing output of the parallel data based on the channel bonding signal of the first link circuit being received non-simultaneously with a second channel bonding signal of a second link circuit of the plurality of link circuits.

12. The method of claim 9 further comprising:
  transitioning the FSM circuit of the primary link circuit to a wait state from an idle state based on receiving the channel bonding signal, and pausing the generation of the read signal by the FSM circuit of the primary link circuit while in the wait state;
  transitioning the FSM circuit of the primary link circuit to an aligned state from the wait state based on the channel bonding signal being received from the first link circuit and a second channel bonding signal being received from a second link circuit of the plurality of link circuits, wherein the FSM circuit of the primary link circuit generates the read signal while in the aligned state; and
  transitioning the FSM circuit of the primary link circuit to the idle state from the aligned state based on the channel bonding signal of the first link circuit being received non-simultaneously with the second channel bonding signal of the second link circuit.

13. The method of claim 9 further comprising:
  transitioning an FSM circuit of the first link circuit of the plurality of link circuits to a wait state from an idle state based on the channel bonding signal being received by the FSM circuit of the first link circuit from the aligner circuit;
  transitioning the FSM circuit of the first link circuit to an aligned state from the wait state based on receiving the read signal the FSM circuit of the primary link circuit; and
  transitioning the FSM circuit of the first link circuit to the idle state from the aligned state based on pausing of the read signal by the FSM circuit of the primary link circuit.

14. The method of claim 13, wherein the read signal includes both a resume read signal and an associated signal, the method further comprising:
  transmitting the resume read signal to the FSM circuit of the first link circuit as the read signal; and
  generating, with the FSM circuit of the first link circuit, a secondary read signal based on the resume read signal.

15. The method of claim 13 further comprising:
  outputting a resume read signal based on receiving the read signal by the FSM circuit of the first link circuit; and
  generating a read primary signal based on the resume read signal.

16. A plurality of link circuits comprising:
  a primary link circuit and a secondary link circuit configured to receive serial data over one or more input serial links, the secondary link circuit configured to:
    receive the serial data from the one or more input serial links and convert the serial data into parallel data;
    stop at least one of storing the parallel data in a memory of an aligner circuit and reading the memory based on a channel bonding signal generated based on a channel bonding symbol in the serial data;
    output the channel bonding signal to an finite state machine (FSM) circuit of the primary link circuit and pause reading the memory; and
    resume reading the memory and output the parallel data based receiving a read signal from the FSM circuit of the primary link circuit.

17. The plurality of link circuits of claim 16, wherein the FSM circuit of the primary link circuit is configured to generate the read signal based on the aligner circuit generating the channel bonding signal.

18. The plurality of link circuits of claim 16, wherein the primary link circuit pauses generation of the read signal preventing the output of the parallel data based on the channel bonding signal being received non-simultaneously with a channel bonding signal of a first link circuit of the plurality of link circuits.

19. The plurality of link circuits of claim 16, wherein the FSM circuit of the primary link circuit is configured to:
   transition to a wait state from an idle state based on receiving the channel bonding signal, generation of the read signal is paused in the wait state;
   transition to an aligned state from the wait state based on the channel bonding signal being received from the secondary link circuit and a second channel bonding signal being received from a first link circuit of the plurality of link circuits, and the read signal is generated in the aligned state; and
   transition to the idle state from the aligned state based on the channel bonding signal being received non-simultaneously with the second channel bonding signal.

20. The plurality of link circuits of claim 16, wherein an FSM circuit of the secondary link circuit is configured to:
   transition to a wait state from an idle state based on a channel bonding signal being received by the FSM circuit of the secondary link circuit from the aligner circuit of the secondary link circuit;
   transition to an aligned state from the wait state based on receiving the read signal from the FSM circuit of the primary link circuit; and
   transition to the idle state from the aligned state based on pausing of the read signal by the FSM circuit of the primary link circuit.

\* \* \* \* \*